No. 788,155.                                          Patented April 25, 1905.

UNITED STATES PATENT OFFICE.

OLIVER E. HORTON, OF JEFFERSON, LOUISIANA.

COMPOSITION FOR DESTROYING PEAR BLIGHT.

SPECIFICATION forming part of Letters Patent No. 788,155, dated April 25, 1905.

Application filed January 20, 1905. Serial No. 242,035.

*To all whom it may concern:*

Be it known that I, OLIVER E. HORTON, a citizen of the United States, residing at Jefferson, in the parish of Webster and the State of Louisiana, have invented a new and useful Composition of Matter to be Used to Destroy Pear Blight, of which the following is a specification.

My composition consists of the following ingredients, combined in the proportions stated, viz.: oil of peppermint, four drams; aqua-ammonia, two ounces; calomel, one ounce; raw linseed-oil, one quart. These ingredients are to be thoroughly mingled by agitation. In using the above composition first remove all of the dead bark from the body of the tree and the large limbs with a pruning-knife, and if there are any dead leaves or tender portion of the tree dead remove them also. Then apply the above preparation with a whitewash-brush or a mop made of soft cotton cloth to the body of the tree from the ground up to as far as the first limbs or to where the dead bark has been removed. When limbs of the tree are found blighted, cut the limbs off two or three inches back of the blighted limb and burn the dead limbs.

First apply the remedy from the 1st of February to the 1st of March. Then carefully notice your trees, applying the remedy two or three times more through spring and summer. Remove any dead or shrunken spots which may be found on the trees, applying the remedy when bark is removed. The above remedy is necessary each year to keep pear-trees clear of blight.

I am aware that a remedy called "Bordeaux mixture," to destroy blight, is being used; but I do not know that all of the ingredients of my composition have been used together.

What I claim, and desire to secure by Letters Patent of the United States, is—

The herein-described composition of matter, consisting of oil of peppermint, aqua-ammonia, calomel, and linseed-oil, substantially as described and for the purpose specified.

In testimony whereof I have signed my name to this specification, in the presence of two subscribing witnesses, on this the 10th day of December, 1904.

OLIVER E. HORTON.

Witnesses:
    F. P. MEDLOCK,
    D. W. STEWART.